United States Patent
Omeis et al.

(10) Patent No.: US 9,447,292 B2
(45) Date of Patent: Sep. 20, 2016

(54) WETTING AND DISPERSING AGENT, PRODUCTION METHOD AND USE THEREOF

(75) Inventors: Jürgen Omeis, Dorsten-Lembeck (DE); Wolfgang Pritschins, Wesel (DE); Frederik Piestert, Wesel (DE); Marcel Krohnen, Hünxe (DE); Sandra O'Shea, Gladbeck (DE)

(73) Assignee: BYK-Chemie GmbH, Wesel (DE)

( * ) Notice: Subject to any disclaimer, the term of this patent is extended or adjusted under 35 U.S.C. 154(b) by 315 days.

(21) Appl. No.: 13/979,578

(22) PCT Filed: Jan. 25, 2012

(86) PCT No.: PCT/EP2012/051155
§ 371 (c)(1),
(2), (4) Date: Sep. 25, 2013

(87) PCT Pub. No.: WO2012/101180
PCT Pub. Date: Aug. 2, 2012

(65) Prior Publication Data
US 2014/0012036 A1    Jan. 9, 2014

(30) Foreign Application Priority Data

Jan. 28, 2011  (EP) .................... 11152549

(51) Int. Cl.
| | | |
|---|---|---|
| *C09D 7/12* | (2006.01) | |
| *C09B 67/00* | (2006.01) | |
| *C09D 5/02* | (2006.01) | |
| *C09D 7/02* | (2006.01) | |
| *C09D 11/03* | (2014.01) | |
| *C09D 17/00* | (2006.01) | |
| *C09B 67/46* | (2006.01) | |

(52) U.S. Cl.
CPC .......... *C09D 7/1233* (2013.01); *C09B 67/009* (2013.01); *C09D 5/027* (2013.01); *C09D 7/02* (2013.01); *C09D 11/03* (2013.01); *C09D 17/002* (2013.01)

(58) Field of Classification Search
CPC ...... C09D 7/1233; C09D 7/02; C09B 67/009
See application file for complete search history.

(56) References Cited

U.S. PATENT DOCUMENTS 4,310,449 A    1/1982  Reischl

FOREIGN PATENT DOCUMENTS

| | | |
|---|---|---|
| EP | 0270126 A2 | 6/1988 |
| EP | 0826753 A1 | 3/1998 |
| EP | 1593700 A1 | 11/2005 |
| JP | 2003238836 A | 8/2003 |
| JP | 2004051982 A | 2/2004 |
| JP | 2007002035 A * | 1/2007 |
| JP | 2008246469 A | 10/2008 |
| WO | WO-94/21368 A1 | 9/1994 |
| WO | WO-99/55763 A1 | 11/1999 |
| WO | WO-00/24503 A1 | 5/2000 |
| WO | WO-00/37542 A1 | 6/2000 |
| WO | WO-2008/037612 A1 | 4/2008 |

OTHER PUBLICATIONS

Zaragoza Dorwald, Side Reactions in Organic Synthesis, 2005, WILEY-VCH Verlag GmbH & Co. KGaA, Weinheim, Preface. p. IX).*
"International Application PCT/EP2012/051155, English Translation of International Preliminary Report on Patentability mailed Aug. 8, 2013", 7 pgs.
"International Application No. PCT/EP2012/051155, International Search Report and Written Opinion mailed Jul. 2, 2012", 11 pgs.

* cited by examiner

*Primary Examiner* — Paul A Zucker
(74) *Attorney, Agent, or Firm* — Schwegman Lundberg & Woessner, P.A.

(57) ABSTRACT

The invention relates to a wetting and dispersing agent that can be produced by carrying out step (1): wherein a) an organic polymer containing primary and/or secondary amino groups and b) at least one branched polyhydroxy-monocarboxylic acid comprising, in addition to a carboxyl group, at least two hydroxy groups, one of which is not bound to the main chain of the molecule, are reacted by condensation reactions, forming amide linkages; and step (2): wherein at least some of the hydroxy groups of the hydroxy-functional reaction product obtained in step (1) are reacted with at least one organic monoisocyanate, forming urethane linkages.

25 Claims, No Drawings

WETTING AND DISPERSING AGENT, PRODUCTION METHOD AND USE THEREOF

PRIORITY CLAIM TO RELATED APPLICATIONS

This application is a national stage application under 35 U.S.C. §371 of PCT/EP2012/051155, filed Jan. 25, 2012, and published as WO 2012/101180 A1 on Aug. 2, 2012, which claims priority to European Patent Application No. 11152549.9, filed Jan. 28, 2011, which applications and publication are incorporated by reference as if reproduced herein and made a part hereof in their entirety, and the benefit of priority of each of which is claimed herein.

The present invention relates to a wetting and dispersing agent preparable by reacting an amino-group-containing organic polymer, a polyhydroxymonocarboxylic acid, and an isocyanate. The present invention further relates to a method for producing the wetting and dispersing agent and also to the use of the wetting and dispersing agent in, for example, coating compositions such as paints or pigment concentrates.

PRIOR ART

It is known practice to supply coating compositions such as, for example, paints, or further products such as sealants and plastics, with wetting and dispersing agents, when incorporating pigments and/or fillers, in order to obtain better particle stabilization in the product in question. Depending on field of application, wetting and dispersing agents may differ in their chemical nature.

A general overview of the theoretical principles and modes of action of wetting and dispersing agents can be found in the book "Lackadditive" by Johan H. Bieleman (J. Bieleman, Lackadditive, Wiley-VCH, 1998, ISBN 3-527-28819-8).

WO 1999/055763 describes aminic dispersants prepared by reacting polyamines or polyimines with linear polyesters that have acrylic functionality and consist of at least two different monomers. These dispersants exhibit high solubility in organic media.

Reaction products of linear polycarboxylic acids with polyamines or polyimines are described in WO 2000/24503 and WO 1994/021368, for example. These compounds can be used in a host of different media such as, for instance, paints or plastics, as dispersants.

A dispersant for dispersing hydrophobic particles in aqueous systems is described in WO 2000/037542. This dispersant consists of a dendritic polymer with peripheral ionizable groups.

WO 2008/037612 describes dendritic dispersants with a polyamine or polyimine basis. The dispersants described have an aminic core around which there is a shell of a fatty acid-modified dendritic polyester. The polymers obtained accordingly can be employed as dispersants especially in apolar paints and they exhibit, for example, a reduction in viscosity of pigment concentrates. Moreover, paint films produced with paints which comprise the stated pigment concentrates show advantageous properties such as high gloss or low propensity toward yellowing, for example. A disadvantage found with these dendritic dispersants is that in some cases they can only be produced reproducibly with difficulty. Another performance problem is the fact that the dendritic dispersants usually have a very dark, in some cases jet black, color. This places severe limits on the usefulness of the dispersants, particularly in light-colored products, as for example in pigment concentrates and/or paints containing white pigments, but also in products which have a very strong color (red, for example) and/or in which very high color accuracy is important. This is especially the case when in the product in question, comparatively high fractions of the respective dispersant are used or are needed in order to achieve a sufficient dispersing effect. For dispersant fractions of greater than 5 wt %, for example, based on the total amount of the respective product, the influence described is particularly marked.

Conventional dispersants, examples being those described above, are usually tailored to specific products and consequently have limited broad-spectrum usefulness. For example, a proportionate reduction in viscosity of pigment concentrates and/or pigmented paints is often achievable only for some types of pigment.

OBJECT OF THE INVENTION

An object of the present invention, accordingly, was to provide a wetting and dispersing agent which by virtue of its outstanding wetting and dispersing effect leads to advantageous properties in various pigment-containing products and/or products containing fillers, examples being pigment concentrates, coating compositions such as paints, or else sealants and/or plastics. The properties of these products ought to be improved further by comparison with those products employing conventional wetting and dispersing agents. To a particular degree the object was to improve various properties of, for example, pigment concentrates and coating compositions such as paints, and hence also of coatings or paint films that are produced using such pigment concentrates and coating compositions. Properties to mention include, for example, a comparatively low viscosity, good storage stability, outstanding gloss, and reduced haze. A good balance ought to be achieved in such properties. Focus here was on the properties—for example, the above-mentioned properties of pigment concentrates, paints, or paint films—being very good not only in one specific type of product precisely tailored to the wetting and dispersing agent, but in a very wide variety of different systems. The broad-spectrum usefulness of the wetting and dispersing agent ought to be outstanding. At the same time, the properties in a particular individual system to which, for example, a conventional dispersant is tailored ought to be at least close to the quality of those obtained when using the respective conventional, tailored dispersant. In certain circumstances, indeed, an improvement should result. In another system or product, one not tailored to the particular conventional dispersant, outstanding properties ought likewise to result, and in that case, moreover, ought to be disproportionately better than when using the respective conventional dispersant. Furthermore, the wetting and dispersing agent ought to possess a coloration which is more neutral by comparison with the known dispersants. The wetting and dispersing agent ought, for example, to possess a white or only slightly brownish color. More particularly it ought to be possible to avoid a jet-black coloring of the wetting and dispersing agent, in order ultimately likewise to improve the broad-spectrum usefulness of the wetting and dispersing agent as a consequence.

Inventive Achievement

In the context of the present invention it has been found that the objects formulated above are achieved by a new wetting and dispersing agent which is preparable by
in step (1) reacting (a) an amino-group-containing organic polymer containing primary and/or secondary amino groups and (b) at least one branched polyhydroxymonocarboxylic acid which as well as a carboxyl group has at least two hydroxyl groups, of which at least one is not bonded to the main chain of the molecule, by condensation reactions with formation of amide bonds, and in step (2) reacting at least some of the hydroxyl groups of the hydroxy-functional reaction product obtained in step (1) with at least one organic monoisocyanate to form urethane bonds.

The new wetting and dispersing agent is referred to below as the wetting and dispersing agent of the invention. Advantageous refinements thereof are apparent from the dependent claims.

The present invention further provides a method for producing the wetting and dispersing agent of the invention. The method is characterized in that in step (1)

(a) an amino-group-containing organic polymer containing primary and/or secondary amino groups and (b) at least one branched polyhydroxymonocarboxylic acid which as well as a carboxyl group has at least two hydroxyl groups, of which at least one is not bonded to main chain of the molecule, are reacted by condensation reactions with formation of amide bonds, and in step (2)

at least some of the hydroxyl groups of the hydroxy-functional reaction product obtained in step (1) are reacted with at least one organic monoisocyanate to form urethane bonds.

Advantageous refinements of the method are apparent from the dependent method claims.

Furthermore, the use of the wetting and dispersing agent of the invention in a pigment- and/or filler-containing product selected from the group of pigment pastes, coating compositions, sealants, printing inks, liquid inks, and plastics is provided by the present invention.

The wetting and dispersing agents of the invention have an outstanding wetting and dispersing action that leads to advantageous properties in different pigment-containing and/or filler-containing products, examples being pigment concentrates and pigmented coating compositions such as paints, and also in coating produced using such pigment concentrates and coatings compositions. At the same time a good balance is achieved in different properties, such as good storage stability, high gloss, and low haze, for example. In comparison to conventional wetting and dispersing agents, moreover, an enhanced broad-spectrum usefulness is obtained. Furthermore, a jet-black coloring of the wetting and dispersing agents of the invention can be avoided. More particularly, the wetting and dispersing agents of the invention have a white or slightly pale brown color. More particularly the wetting and dispersing agents of the invention exhibit a significantly lighter color.

DETAILED DESCRIPTION OF THE INVENTION

The wetting and dispersing agent of the invention is preparable by reacting an amino-group-containing organic polymer (a) with the components described later on below. The amino-group-containing organic polymer (a) is composed of a plurality of, more particularly at least 5, identical or different monomer units, and possesses at least one, preferably two or more, more particularly at least 5 amino groups. These amino groups may be primary, secondary and/or tertiary. The amino-group-containing organic polymer (a), however, comprises at least one, preferably more than one, more preferably at least 5 amino groups which are primary and/or secondary.

The amino-group-containing organic polymer (a) is preferably an aliphatic poly-($C_2$-$C_4$)-alkylenamine. With particular preference it is selected from the group of polyethyleneimines, polyvinylamines, polyallylamines, and copolymers of these polymers. Especial preference is given to using branched aliphatic polyamines having primary, secondary, and tertiary amino groups. Especially advantageous are the aziridine homopolymers, also known under the name polyethyleneimines, such as, for example, the Lupasol™ products from BASF SE or the Epomin products from Nippon Shokubai. These products are prepared by known processes, as for example by the polymerization of ethyleneimine. The ratio of primary to secondary to tertiary nitrogen atoms may vary greatly and is preferably—as is customary in the case of the corresponding commercial products—in the region, for instance, of 2:2:1. As is customary in the case of the corresponding commercial products, the total amount of amino groups in these polymers is for instance in the region of 20 mmol of amino groups per gram of polymer. Among these branched aliphatic polyamines, preference is given to using products having a number-average molecular weight of around 200-200 000 g/mol ($M_n$, measured ebullioscopically), more preferably products having a number-average molecular weight of around 250-40 000 g/mol.

The protons on the primary and secondary amino groups of these organic amino-group-containing organic polymers (a) may optionally be substituted proportionally by alkyl, aryl and/or aralkyl groups. Moreover, the amino groups may also be quaternized proportionally via alkyl, aryl and/or aralkyl groups.

The polyethyleneimines, polyvinylamines and/or polyallylamines, more particularly polyethyleneimines, used with preference are preferably specially modified. The modification is accomplished by reaction of the amino-group-containing organic polymer (a) with monomers selected from the group of lactones, alkyl-substituted lactones, monohydroxymonocarboxylic acids, and monocarboxylic acids. In such reactions at least some of the primary and/or secondary amino groups of the amino-group-containing organic polymer (a) are modified to form amide bonds with radicals based on the stated monomers. Where the modification is by lactones, alkyl-substituted lactones and/or monohydroxymonocarboxylic acids, as preferred in accordance with the invention, the modified amino groups may carry radicals based on precisely one monomer of the stated compounds. Preferably, however, at least some of the modified amino groups in the case of the radicals are linear polyester chains comprising at least 2, preferably 2 to 100, more particularly 2 to monomer units of the stated monomers. Such modifications may be introduced, for example, by means of polymerization methods for lactones that are familiar to the skilled person, at temperatures of around 70° C. to 180° C., with the use, for example, of corresponding, customary catalysts, such as organotin compounds such as dibutyltin dilaurate, or by polycondensation processes known per se to the skilled person for monohydroxymonocarboxylic acids, at temperatures of around 50 to 200° C. In each case, every radical introduced by the modification carries precisely one free hydroxyl group. For each primary and secondary amino group converted by the modification into an amide bond, therefore, the amino-group-containing organic polymer (a) possesses precisely one free hydroxyl group after the modification. As already indicated, at least some of the primary and/or secondary amino groups of the respective amino-group-containing organic polymer (a), more particularly of the polyethyleneimine, are modified or reacted as described. Preferably the maximum possible fraction of the primary and/or secondary amino groups in each case is modified or reacted. By the maximum possible fraction in the context of the present invention is meant the fraction of primary and/or secondary amino groups which can at maximum be modified in a reaction described as above. Theoretically these are all primary and/or secondary amino groups which the respective amino-group-containing organic polymer (a) comprises. In actual practice, however, generally not all of the primary and/or secondary amino groups are reacted, since some of these amino groups are sterically shielded, for example, by the construction and/or spatial arrangement of the polymer (a) and/or by the modification radicals already attached, such as the linear polyester chains, for example, and hence are not reacted.

In particular, in the context of the present invention, a reaction or modification elucidated as above is achieved by using the monomers for the modification (lactones, alkyl-substituted lactones, monohydroxymonocarboxylic acids and/or monocarboxylic acids) in a stoichiometric excess relative to the total amount of primary and/or secondary amino groups in the amino-group-containing organic polymer (a). With particular advantage, the molar ratio of the monomers for the modification to the primary and/or secondary amino groups of the amino-group-containing organic polymer (a) is in the range from 1/1 to 100/1, preferably in the range from 1/1 to 25/1, more preferably in the range 2/1 to 20/1.

The modifications described as above are introduced before the reaction, described later on below, of the amino-group-containing organic polymer (a) with the at least one branched polyhydroxymonocarboxylic acid. This means that the modification of the respective amino-group-containing organic polymer (a) always takes place in an independent step. Particularly preferred in the context of the present invention is the modification of the amino-group-containing organic polymer (a) with ε-caprolactone and/or δ-valerolactone with formation of linear polyester chains attached via amide bonds.

Step (1)

For the preparation of the wetting and dispersing agent of the invention, in a first step, the amino-group-containing organic polymer (a) and at least one branched polyhydroxymonocarboxylic acid (b), which in addition to a carboxyl group has at least two hydroxyl groups, of which at least one is not bonded to the main chain of the molecule, are first reacted (step (1)). Branched means, as is known, that the monomer has not only a linear carbon chain but also possesses at least one branching point in the chain, or possesses at least one side chain. The main chain of the molecule is determined in accordance with the familiar IUPAC rules—for example, it may be the longest carbon chain in the molecule in question or, in case of ambiguity of this parameter, it may be a correspondingly substituted carbon chain. Where there are two completely matching carbon chains present, both of which may be considered as a main chain, one of the two such chains is specified as the main chain, and the other is viewed, formally, as a branch or side chain. The at least one hydroxyl group which is not on the main chain is situated, accordingly, on a carbon atom which is part of a branch or part of a side chain of the molecule, and not part of the main chain.

Employed with preference as branched polyhydroxymonocarboxylic acids (b) are 2,2-bis(hydroxymethyl)-propionic acid and/or 2,2-bis(hydroxymethyl)butyric acid. 2,2-Bis(hydroxymethyl)propionic acid is especially preferred.

The at least one branched polyhydroxymonocarboxylic acid (b) is linked in each case by the carboxyl group through a condensation reaction with the organic polymer (a). Such condensation reactions are carried out at temperatures, for example, of around 50° C. to 200° C. Further information on the reaction regime can be found in the examples given later on below. The reaction may involve linking with a primary or secondary amino group of the amino-group-containing polymer (a), to form an amide bond. It is nevertheless possible, and preferred, for the amino-group-containing polymer (a) to be modified as elucidated earlier on above, prior to step (1). In accordance with the above observations, it should be taken into account, in the context of the present invention, that the respective amino-group-containing organic polymer (a), if it has been modified, preferably no longer possesses any sterically accessible primary and/or secondary amino groups, or preferably, possibly, no longer possesses any primary and/or secondary amino groups at all. This may then mean that in step (1) (reaction of the amino-group-containing organic polymer (a) and at least one branched polyhydroxymonocarboxylic acid (b)) no primary and/or secondary amino groups are reacted with the branched polyhydroxymonocarboxylic acid (b). All that then occurs is a reaction of the at least one branched polyhydroxymonocarboxylic acid (b) and the hydroxyl groups which are introduced by the modification of the amino-group-containing organic polymer (a) and of which in each case precisely one is present in a radical introduced at the modification, preferably the linear polyester chains, with formation of ester bonds. It is therefore possible for the amino-group-containing organic polymer (a), after the modification and before the reaction in step (1), to no longer possess any sterically accessible and possibly no primary and secondary amino groups at all. Irrespective of whether modification is present or not, however, the polymer (a) used in step (1) is fundamentally the same macromolecule. In the context of the present invention, therefore, even a polymer modified as described is always referred to as amino-group-containing organic polymer (a) or as amino-group-containing organic polymer (a) comprising primary and/or secondary amino groups.

The at least one branched polyhydroxymonocarboxylic acid (b) is advantageously used on an at least equimolar basis, more particularly in a stoichiometric excess, relative to the total number of primary and secondary amino groups present in the amino-group-containing organic polymer (a). The molar ratio of the primary and secondary amino groups of component (a) to component (b) is more particularly in the range from 0.001 to 1, more particularly in the range from 0.01 to 1, very preferably in the range from 0.1 to 1. The stated ranges for the molar ratio are based in each case on components (a) and (b) prior to a possible modification of the components, as for example the specific modification, described above, of the amino-group-containing organic polymer (a), and/or the specific modification, described later on below, of the at least one polyhydroxymonocarboxylic acid (b). In particular embodiments of the present invention, besides the above-described condensation reaction between the amino-group-containing organic polymer (a) and the at least one branched polyhydroxymonocarboxylic acid (b), with formation of amide bonds, there is also, at the same time, a condensation reaction ongoing between the individual polyhydroxymonocarboxylic acid molecules with one another, with formation of ester bonds. This can be achieved, for example, through corresponding selection of the molar ratio of the primary and secondary amino groups of component (a) to component (b). More particularly, the described condensation reaction between the individual polyhydroxymonocarboxylic acid molecules with one another, with formation of ester bonds, is achievable through the use of the molar ratios, described earlier on above as being preferred, for the primary and secondary amino groups of component (a) to component (b). In this case one carboxyl group of one molecule undergoes esterification in each case with one of the hydroxyl groups of a further molecule. As a result of the linking of the polyhydroxymonocarboxylic acid molecules to one another and the fact that each polyhydroxymonocarboxylic acid molecule possesses precisely one carboxyl function and at least two hydroxyl functions, and starting from the first molecule, which is linked to the amino-group-containing organic polymer (a), a plurality of layers of increasingly more branched structural units are constructed accordingly. Each new layer may be termed a new generation. In this context, all or only some of the hydroxyl groups respectively present in a layer may be esterified with the carboxyl groups of further polyhydroxymonocarboxylic acid molecules, and a respectively new layer or generation is then constructed as a result. Of course, even a single generation must be termed a branching unit. This is governed by the fact that the at least two hydroxyl groups of the molecule, as described above, are located in chains which are branched relative to one another. Preferred, however, is the formation of a plurality of generations, which is then a prerequisite for the described condensation reaction between the individual polyhydroxymonocarboxylic acid molecules with one another. The degree of branching or the number of generations here is of course dependent on a variety of factors, such as, for example, the molar ratio of the primary and secondary amino groups of component (a) to component (b). Another important factor, for example, is the extent to which the respective hydroxyl groups of a generation are sterically accessible. This in turn is dependent, for example, on the spatial construction of the macromolecule, more particularly the amino-group-containing organic polymer (a).

Starting from the polyaminic core or amino-group-containing organic polymer (a), the structural units described adopt a star-shaped construction with outward growth. In the context of the present invention, the polyester units may be only slightly branched, with only one or two generations. Possible and preferred, however, are more complex structural units as well, with more than two generations, which may then be termed highly branched structures. In particular embodiments of the present invention, the number of generations is in the range from 1 to 200, preferably in the range from 1 to 50. A number of generations of this kind can be obtained in the context of the present invention through use of the components (a) and (b), for use in step (1), in the molar ratios described earlier on above for primary and secondary amino groups of component (a) to component (b)—that is, in other words, more particularly through use of stoichiometric excesses of component (b) relative to the primary and secondary amino groups of component (a).

For greater ease of comprehension, the formula (I) below shows a detail of a condensation product, exhibiting star-shaped outward growth, comprising an (unmodified) amino-group-containing organic polymer unit and also branching polyester units with a plurality of generations, based on a polyhydroxymonocarboxylic acid (b). For the illustration, the polyhydroxymonocarboxylic acid (b) selected was the preferred compound 2,2-bis(hydroxymethyl)propionic acid.

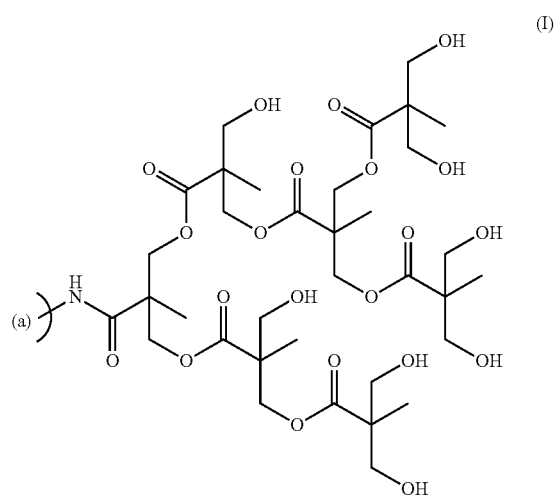 [SMILES: CNC(=O)C(C)(COC(=O)C(C)(CO)COC(=O)C(C)(CO)CO)COC(=O)C(C)(CO)COC(=O)C(C)(COC(=O)C(C)(CO)CO)COC(=O)C(C)(CO)CO]

In preferred embodiments of the present invention, component (b) is specially modified prior to the reaction as per step (1). For the purposes of this modification, the at least one polyhydroxymonocarboxylic acid (b) is reacted, with formation of ester bonds, with monomers selected from the group of lactones, alkyl-substituted lactones, and monohydroxymonocarboxylic acids. The primary reaction here is that of at least some of the hydroxyl groups in the polyhydroxymonocarboxylic acid molecules with the stated monomeric compounds. The hydroxyl groups here may be modified with radicals based on precisely one monomer of the stated monomeric compounds. Generally speaking, however, the radicals in question are, at least proportionally, linear polyester chains comprising 2 to 100 monomer units, preferably 2 to 25 monomer units, of the stated compounds. Such reactions or modifications may be carried out, for example, by means of lactone polymerization processes familiar to the skilled person, at temperatures of around 70° C. to 180° C., with use, for example, of corresponding, customary catalysts, such as organotin compounds such as dibutyltin dilaurate, or by means of monohydroxymonocarboxylic acid polycondensation processes known per se to the skilled person, at temperatures of around 50° C. to 200° C. Such modification reduces the spatial density of hydroxyl groups in the resultant new molecule. In each case, each radical introduced by the above-described modification that takes place primarily carries precisely one free hydroxyl group, and so the total number of hydroxyl groups in component (b) is not altered by this modification.

As the skilled person is well aware at any rate, polyhydroxymonocarboxylic acid molecules (b) themselves may also be incorporated by copolymerization into the polyester chains in the course of the described reaction or modification of component (b) and the preferably accompanying formation of linear polyester chains, for purely statistical reasons, as radicals. This is because component (b) likewise comprises a carboxyl group and also hydroxyl groups. The copolymerization of the polyhydroxymonocarboxylic acid molecules (b) then results in corresponding hydroxy-functional branching sites in the molecule, to which corresponding radicals, more particularly linear polyester chains, may then be linked in turn via the reaction regime described.

Each copolymerized polyhydroxymonocarboxylic acid molecule then leads to precisely one additional branching site, and increases the total number of hydroxyl groups in the respective modified molecule of component (b) by precisely one hydroxyl group. In this way, ultimately, in terms of the branches or generations, the structures generated are similar to those described earlier on above in the context of the description of step (1). This is a branching reaction which precedes the actual step (1), therefore. What distinguishes it, however, is the fact that the linear polyester chains described are inserted as spacer units between the individual generations.

In the case of the modification of component (b), the molar ratio of the modifying monomers selected from the group of lactones, alkyl-substituted lactones, and monohydroxymonocarboxylic acids to the at least one polyhydroxymonocarboxylic acid (b) is situated, for example, in the range from 0.01/1 to 1000/1, preferably in the range from 1/1 to 100/1, with more particular advantage in the 1/1 to 10/1 range. With the preferred molar ratios it is possible more particularly to ensure that on the one hand the hydroxyl groups of component (b) are modified at least proportionally with linear polyester chains comprising two or more, particularly 2 to 25, monomer units, and on the other hand that there is at least a proportional preliminary branching, as described above, through copolymerization of polyhydroxymonocarboxylic acid molecules (b).

The modifications of component (b) that are described as above are introduced prior to the reaction, described earlier on above, of component (a) and (b) (step (1)). This means that the modification of the respective at least one polyhydroxymonocarboxylic acids (b) always takes place in an independent step.

Particularly preferred in the context of the present invention is the modification of the polyhydroxymonocarboxylic acids (b) with ε-caprolactone and/or δ-valerolactone.

For greater ease of comprehension, the formula (II) below shows a detail of a condensation product with star-shaped outward growth, comprising an (unmodified) amino-group-containing organic polymer unit and also branching polyester units with a plurality of generations, which are based, as modified polyhydroxymonocarboxylic acid (b), on 2,2-bis(hydroxy-methyl)propionic acid specially modified as described above.

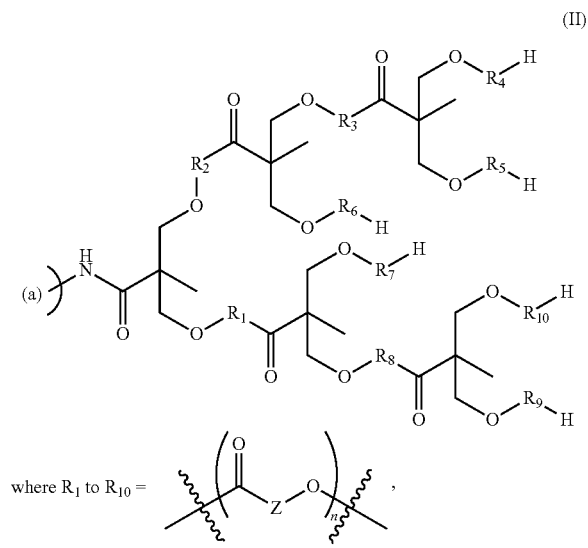

(II)

where:
n≥1, preferably 2 to 100, more particularly 2 to 25,
Z=identical or different aliphatic structural units, selected—depending on the particular monomer—from the group of lactones, alkyl-substituted lactones, and monohydroxymonocarboxylic acids,
where $R_1$ to $R_{10}$ are identical or different, preferably different.

It should be noted that for determining the positions of the hydroxyl groups as a function of the main chain, the side chains, or the branches, as described earlier on above, it is the unmodified parent molecule that is the governing factor, even in the modified polyhydroxymonocarboxylic acids. In the context of the present invention, main chain, side chains, and branches are not altered by the modification with regard to the determination of the positions of the hydroxyl groups. All that the modification does is to insert a spacer unit, preferably a polyester chain as defined above, between parent molecule and hydroxyl group.

Step (2):

The hydroxy-functional reaction product from step (1), which comprises an amino-group-containing organic polymer unit and also polyester units which may have highly branched character, is reacted in a second step with at least one organic monoisocyanate comprising precisely one isocyanate group (step (2)), thereby producing the wetting and dispersing agent of the invention. The organic monoisocyanate molecules are introduced via the isocyanate groups, by linking with at least some of the hydroxyl groups of the reaction product obtained in step (1), with formation of a urethane bond, thereby forming the wetting and dispersing agent of the invention. Preferably more than 5 mol %, more particularly 5 to 95 mol %, more preferably 20 to 80 mol %, very preferably 30 to 75 mol %, of the hydroxyl groups of the reaction product obtained in step (1) are reacted with the at least one organic monoisocyanate. The degree of conversion of the hydroxyl groups is determined via determination of the hydroxyl number (in accordance with DIN/ISO 4629) of the product resulting after step (1) and of the wetting and dispersing agent of the invention resulting after step (2).

Organic monoisocyanates are, for example, compounds selected from the group of monoisocyanates comprising organic units such as alkylene, cycloalkylene, alkenyl, alkynyl, arylene, polyether, polyester and/or fatty acid radicals and also mixtures of such radicals. Organic monoisocyanates used with preference are those which comprise a linear or branched or cyclic alkyl radical having optionally further linear and/or branched groups, said radical being able optionally to comprise one or more double bonds and/or triple bonds, and having 1 to 50 carbon atoms, and/or aryl isocyanates, isocyanate-functional polyethers, isocyanate-functional polyesters, isocyanate-functional polytetrahydrofurans, isocyanate-functional polyetheresters or fatty acid monoisocyanates, and also mixtures of such compounds, are employed. Preference is given to using isocyanate-functional polyethers, isocyanate-functional polytetrahydrofurans, isocyanate-functional polyesters and/or isocyanate-functional polyetheresters.

The organic monoisocyanates are preferably reaction products of diisocyanates with different monoalcohols. This means that the organic monoisocyanates, in addition to the organic units specified above, preferably comprise at least one, more particularly precisely one, urethane group, formed in each case by the reaction of a diisocyanate with a monoalcohol. The reaction may be carried out, for example, in a stoichiometric excess (for example 2 to 10 equivalents, based on the monoalcohol) of the diisocyanate and/or by introducing the diisocyanate and slowly adding the monoalcohol dropwise at temperatures from around 20° C. to 80° C. Any excess diisocyanate can be removed by distillation after the end of the reaction. Further information on the described reaction of diisocyanates with monoalcohols can be found in the examples given later on below.

The diisocyanate used comprises the diisocyanates known to the skilled person, such as, for example, isophorone diisocyanate, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptanmethylene diisocyanate, 2,4-tolylene diisocyanate, 2,6-tolylene diisocyanate, and mixtures of such diisocyanates. Preference is given to using 2,4-tolylene diisocyanate, and/or 2,6-tolylene diisocyanate.

Monoalcohols which can be used for the reaction of the diisocyanates are, for example, straight-chain or branched alcohols such as methanol, ethanol, butanol, ethylhexanol, decanol, isotridecyl alcohol, lauryl alcohol, stearyl alcohol, isobornyl alcohol, benzyl alcohol, propargyl alcohol, oleyl alcohol, linoleyl alcohol, oxo alcohols, neopentyl alcohol cyclohexanol, fatty alcohols, alkylphenols, monophenyldiglycol, alkylnaphthols, phenylethanol and/or monohydroxymonocarboxylic acids. Employed with preference are monohydroxy-functional polyesters, polyethers and/or polyetheresters.

Preferred monohydroxy-functional polyesters are those obtainable by polycondensation of one or more, optionally alkyl-substituted hydroxycarboxylic acids and/or by ring-opening polymerization of the corresponding lactones such as propiolactone, γ-butyrolactone, δ-valerolactone and/or ε-caprolactone, for example, by means of a monohydroxy starter component. They preferably possess a number-average molecular weight $M_n$ of 150 to 5 000 g/mol. The monofunctional alcohols used as a starter component preferably possess 1 to 30, more preferably 4 to 14, carbon atoms. Use may be made, for example, of n-butanol, ethylhexanol, decanol, isotridecyl alcohol, lauryl alcohol, stearyl alcohol, longer-chain, saturated and unsaturated alcohols such as propargyl alcohol, oleyl alcohol, linoleyl alcohol, oxo alcohols, cyclohexanol, phenylethanol, and also fluorinated alcohols, hydroxy-functional vinyl compounds such as hydroxybutyl vinyl ether, for example, hydroxy-functional (meth)acrylates such as hydroxyethyl(meth) acrylate, hydroxybutyl (meth)acrylate and/or hydroxy-functional polyalkylene glycol(meth)acrylates. It is also possible for alcohols of the above-described kind and substituted and unsubstituted phenols to be converted, by alkoxylation by known methods with alkylene oxides such as ethylene oxide, propylene oxide, butylene oxide and/or styrene oxide, for example, into polyoxyalkylene monoalkyl, polyoxyalkylene monoaryl, polyoxyalkylene monoaralkyl, and polyoxyalkylene monocycloalkyl ethers, and for these hydroxy polyethers to be used, in the manner described above, as a starter component for the lactone polymerization. Mixtures of the aforementioned compounds can also be used in each case. The lactone polymerization is catalyzed by known methods, as for example by addition of p-toluenesulfonic acid or dibutyltin dilaurate, at temperatures of around 70° C. to 180° C. Particularly preferred are polyesters based on ε-caprolactone, optionally in combination with δ-valerolactone.

With preference it is also possible to use monohydroxypolyethers. These polyethers may be obtained, for example, by alkoxylating the above-described monoalcohols such as alkanols, cycloalkanols, or phenols or the above-described hydroxy polyesters with alkylene oxides such as ethylene oxide, propylene oxide, butylene oxide, styrene oxide, or mixtures thereof. In the case of mixed polyethers, they may have a random, gradient or blockwise arrangement. These polyethers usefully have a number-average molecular weight ($M_n$) in the range from about 100 to 10 000, preferably from 150 to 5000, and more preferably from 200 to 3500 g/mol. Preferred polyethers are those based on ethylene oxide, propylene oxide, and mixtures thereof. Further preferred are monohydroxy-functional polyoxyalkylene monoalcohols such as allyl polyethers such as, for example, Polyglycol A 350, Polyglycol A 500, Polyglycol A 1100, Polyglycol A 11-4, Polyglycol A 20-10, or Polyglycol A 20-20 from Clariant AG or Pluriol® A 010 R, Pluriol® A 11 RE, Pluriol® A 13 R, Pluriol® A 22 R, or Pluriol® A 23 R from BASF AG, vinyl polyethers such as for example, Polyglycol V 500, Polyglycol V 1100, or Polyglycol V 5500 from Clariant AG, polyoxyethylene monoalcohols prepared starting from methanol, such as Pluriol® A 350 E, Pluriol® A 500 E, Pluriol® A 750 E, Pluriol® A 1020 E, Pluriol® A 2000 E, or Pluriol® A 5010 E from BASF AG, for example, polyoxypropylene monoalcohols prepared starting from alkanol, such as Polyglycol B01/20, Polyglycol B01/40, Polyglycol B01/80, Polyglycol B01/120, or Polyglycol B01/240 from Clariant AG or Pluriol® A 1350 P or Pluriol® A 2000 P from BASF AG, and polyoxyalkylates prepared starting from various fatty alcohols, with a variable degree of alkoxylation, of the kind known to the skilled worker under the trade names Lutensol® A, Lutensol® AT, Lutensol® AO, Lutensol® TO, Lutensol® XP, Lutensol® XL, Lutensol® AP, and Lutensol® ON from BASF AG. Preference is given to use of polyoxyalkylene monoalcohols which contain ethylene oxide and/or propylene oxide and/or butylene oxide groups and are optionally modified with styrene oxide. Particularly preferred is the use of polyoxyalkylene monoalcohols such as, for example, Polyglycol B 11/50, Polyglycol B 11/70, Polyglycol B 11/100, Polyglycol B 11/150, Polyglycol B 11/300, or Polyglycol B 11/700 from Clariant AG, Pluriol® A 1000 PE, Pluriol® A 1320 PE, or Pluriol® A 2000 PE from BASF AG, or Terralox WA 110 from DOW Chemicals, these being polyoxyalkylenes prepared starting from butanol, and comprising ethylene oxide and propylene oxide, with a terminal OH group.

Likewise provided with the present invention is a method for producing the wetting and dispersing agent of the invention. In this method, first of all, in a first step, an amino-group-containing organic polymer (a) optionally modified as described above, and at least one branched polyhydroxymonocarboxylic acid (b) optionally modified as described above, are reacted by condensation reactions, with formation of amide bonds (step (1)). This is then followed in step (2) by the reaction of at least some of the hydroxyl groups in the hydroxy-functional reaction product obtained in step (1), comprising an amino-group-containing organic polymer unit and also polyester units which optionally have highly branched character, with at least one organic monoisocyanate, with formation of urethane bonds, thereby forming the wetting and dispersing agent of the invention.

The amino-group-containing organic polymer (a) is preferably used in a modified form as described above. This means more particularly that the amino-group-containing organic polymer (a) or at least a fraction of the primary and/or secondary amino groups present therein is reacted with lactones, alkyl-substituted lactones and/or monohydroxymonocarboxylic acids prior to the reaction with the at least one polyhydroxymonocarboxylic acid (b) as per step (1) as described earlier on above.

Preference is given, moreover, to the use of polyhydroxymonocarboxylic acids (b) modified as described above, in which case the at least one polyhydroxymonocarboxylic acid (b) is reacted, with formation of ester bonds, with monomers selected from lactones, alkyl-substituted lactones, and monohydroxymonocarboxylic acids.

Suitable reaction conditions for the corresponding reactions, as for example the condensation reactions in step (1) and (2), have already been given earlier on above. Detailed information, moreover, can be found in the working examples given below. More particularly, temperatures in the range from around 50° C. to 200° C. are to be selected in the case of the condensation reactions, or in the range from around 70° C. to 200° C. in the case of the ring-opening polymerization processes of lactones. Familiar catalysts such as acids are optionally also employed (especially in the case of the condensation reactions). Also employed are organometallic compounds such as dibutyltin dilaurate, for example, especially in the case of the lactone polymerizations.

Additionally provided with the present invention is the use of the wetting and dispersing agent of the invention in pigmented and/or filler-containing products, examples being pigment concentrates, coating compositions, sealants and/or plastics, preferably in coating compositions, as for example paints, and also pigment concentrates for coating compositions such as paints. Especially preferred are pigment concentrates which can be mixed with corresponding letdown systems, in order to produce pigmented paints.

The present invention, moreover, also provides a pigment- and/or filler-containing product selected from the group of pigment concentrates, coating compositions, sealants, and plastics, and comprising at least one wetting and dispersing agent of the invention.

The pigment and/or filler-containing concentrates preferred in accordance with the invention and comprising at least one wetting and dispersing agent of the invention can be used not only in the aforementioned letdown systems for pigmented paints. Likewise possible is their use in a wide range of formulations and products, such as resins, oils, fats, lubricants, rubber materials, sealants, printing inks, liquid inks, adhesives, waxes, or coating material compositions, for example. The concentrates can also be used in formulations which are produced in the bodycare industry, or in electrical applications in the electronics industry, in the marine industry, as part of medical applications, in the construction industry, or in the automotive industry. Examples include cosmetic products, electronic paper, such as the display in e-books, for example, the encapsulation of microelectronic chips, submarine hull coatings, such as antifouling coatings, for example, silicone tubes, or lubricant additives for braking components. Mention may likewise be made of the application fields of NIP (nonimpact printing), inkjet (on paper, film, ceramic, synthetic fabric, and natural fabric), dispersing of ceramic (aqueous or water-free), dispersing in epoxy casting compounds. The wetting and dispersing agent of the invention may also be employed itself—that is, without having been incorporated beforehand into a corresponding concentrate—in the aforementioned formulations and areas of application.

The pigment- and/or filler-containing product comprising at least one wetting and dispersing agent of the invention is preferably a coating composition, as for example a paint, or a pigment concentrate for coating compositions such as paints. Ultimately, however, its use in any desired pigment-containing and/or filler-containing products is possible.

The pigment concentrates are more particularly compositions which as well as the wetting and dispersing agent of the invention comprise, for example, organic solvents and at least one pigment. They contain more particularly no organic polymers, or only small fractions of organic polymers, as binders. Such binders, known to the skilled person, are advantageously present in the corresponding letdown systems and are described later on below.

Organic solvents employed are the typical organic solvents used in the paint and varnish industry sector and known to the skilled person, such as, for example but not exclusively, aliphatic solvents, cycloaliphatic solvents, aromatic solvents such as toluene, xylene, solvent naphtha, typical ethers, esters and/or ketones such as, for example, butyglycol, butyldiglycol, butyl acetate, methyl isobutyl ketone, methyl ethyl ketone and/or solvents such as methoxypropyl acetate and diacetone alcohol.

Pigments employed are the pigments known to the skilled person. Examples of pigments are mono-, di-, tri-, and polyazo pigments, oxazine, dioxazine, and thiazine pigments, diketopyrrolopyrroles, phthalocyanines, ultramarine and other metal-complex pigments, indigoid pigments, diphenylmethane, triarylmethane, xanthene, acridine, quinacridone, and methine pigments, anthraquinone, pyranthrone, perylene, and other polycyclic carbonyl pigments, inorganic pigments such as carbon black pigments and/or pigments based on carbon black, graphite, zinc, titanium dioxide, zinc oxide, zinc sulfide, zinc phosphate, barium sulfate, lithopones, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example, nickel titanium yellow, bismuth vanadate molybdate yellow, or chromium titanium yellow), magnetic pigments based on pure iron, iron oxides, and chromium oxides or mixed oxides, metallic effect pigments comprising aluminum, zinc, copper, or brass, and also pearlescent pigments, and fluorescent and phosphorescent pigments. Other examples are nanoscale organic or inorganic solids with particle sizes of below 100 nm such as certain carbon black products or other allotropic forms of carbon such as swCNTs, mwCNTs, and graphene. The particle size is determined for example by means of transmission electron microscopy, analytical ultracentrifugation, or methods of light scattering. Likewise notable are particles which consist of a metal or semimetal oxide or hydroxide, and also particles consisting of mixed metal and/or semimetal oxides and/or hydroxides. Extremely finely divided solids of this kind may be prepared, for example, with the oxides and/or oxide hydroxides of aluminum, of silicon, of zinc, of titanium, etc. The method for producing these oxidic or hydroxidic or oxide-hydroxidic particles may involve any of a very wide variety of different methods, such as, for example, ion exchange processes, plasma processes, sol-gel techniques, precipitation, comminution (by grinding, for example) or flame hydrolysis, and the like.

Where the respective products, more particular the coating compositions, comprise fillers, the fillers in question are, for example, those known to the skilled person. Examples of fillers in powder or fiber form are for example those composed of powderous or fibrous particles of aluminum oxide, aluminum hydroxide, silicon dioxide, kieselguhr, siliceous earth, quartz, silica gel, talc, kaolin, mica, perlites, feldspar, finely ground slate, calcium sulfate, barium sulfate, calcium carbonate, calcite, dolomite, glass, or carbon. Other examples of pigments or fillers are found for example in EP-A-0 270 126. Flame retardants as well such as, for example, aluminum hydroxide or magnesium hydroxide and matting agents such as, for example, silicas may likewise outstandingly be dispersed and stabilized by the wetting and dispersing agents of the invention.

Depending on the field of use, the wetting and dispersing agents of the invention are employed in amounts such that in the product which is ultimately of interest for the ongoing application, the fraction of the wetting and dispersing agent of the invention is advantageously from 0.01 to 10 wt %, based on the total amount of the product in question. Higher fractions, however, are also possible. Where, for example, the product that is of interest for ongoing application is a pigmented coating composition or pigmented paint and the wetting and dispersing agent of the invention is employed in a pigment concentrate which is subsequently used to produce the paint, the fraction of the wetting and dispersing agent of the invention in the concentrate will be correspondingly greater than in the pigmented coating composition to be produced. Important in this context, for example, is the proportion in which the pigment concentrate and the letdown system will be mixed.

Based on the solid to be dispersed, such as the pigment, for example, the wetting and dispersing agent of the invention is used in an amount of preferably 0.5 to 100 wt %. Where difficult-to-disperse solids are used, the amount of wetting and dispersing agent of the invention that is used may well be higher. The amount of dispersant is generally dependent on the surface area to be occupied on the substance that is being dispersed. It may thus be important, for example, which pigment is involved. Generally speaking, it may be said that typically less dispersant is needed to disperse inorganic pigments than for organic pigments, since the latter usually possess a higher specific surface area and hence a greater amount of dispersant is needed. Typical levels of addition of the wetting and dispersing agent for inorganic pigments are, for example, 1 to 20 wt %, or for organic pigments 10 to 50 wt %, based in each case on the solid to be dispersed, more particularly the pigment. In the case of very finely divided pigments (certain carbon blacks, for example), added quantities of 30% to 90% or more are also needed. Criteria which can be used for sufficient pigment stabilization include, for example, gloss and transparency of the coating compositions or the degree of floating. The dispersing of the solids may take place in the form of individual dispersion or mixed dispersion with two or more pigments simultaneously, with the best results being achievable generally in the case of single dispersion operations. When mixtures of different solids are used, opposite charges on the surfaces of the solids may result in an increased incidence of agglomeration in the liquid phase.

The products, more particularly the coating compositions or paints, in which the wetting and dispersing agents of the invention are to develop their activities ultimately, may further comprise an organic polymer as binder. Such binders are known to the skilled person and are described inter alia in a nonexhaustive recitation, in Römpp Lacke and Druckfarben, Georg Thieme Verlag, Stuttgart New York, 1998, pages 73 to 74. This at least one binder may be introduced, for example, via a letdown system, which is mixed, for example, with a pigment concentrate comprising the wetting and dispersing agent of the invention, and so the product in question constitutes a pigmented paint. Also possible, however, are other pigmented and/or filler-containing products, examples being plastics, sealants, and further products known to the skilled person and based on an organic polymeric matrix. A product for the purposes of the present invention is a system which comprises a polymeric resin or organic polymer as binder and is thereby capable of forming a solid organic, polymeric matrix (a coating composition, for example) under appropriate curing conditions. Likewise termed a product is a system which through simple mixing with a component comprising a binder is capable of forming one such organic, polymeric matrix (a pigment concentrate, for example). Employed by way of example but not exclusively are the alkyd resins, polyester resins, acrylate resins, polyurethane resins and/or epoxy resins that are known to the skilled person. Both 1-component systems and 2-component systems are possible, and in the latter case, generally speaking, a second component also comprises, for example, polyisocyanates, melamine resins and/or polyamide resins as the typical crosslinking agents familiar to the skilled person. Preferred in the context of the present invention are product systems, more particularly coating compositions, which comprise an acrylate resin as binder. In another embodiment of the invention the system is a 2-component (2K) coating composition or a 2K paint which comprises an epoxy resin in the binder component and a polyamide resin in the crosslinker component.

The coating compositions which are preferred as products may be water-based or solvent-based, preferably solvent-based. Water-based for the purposes of the present invention means that the solvent of the coating composition comprises primarily water. More particularly, in the case of a water-based coating composition, there is not more than 10 wt % of organic solvents present in the coating composition, based on the total amount of solvents. A solvent-based coating composition for the purposes of the present invention is one containing not more than 5 wt %, preferably not more than 2 wt %, of water, based on the total amount of solvents. In comparison to the above-indicated proportions on which the water-based or solvent based character is based, the coating composition may of course also contain more balanced proportions or ratios of organic solvents and water.

The products, more particularly the pigment concentrates and coating composition comprising at least one wetting and dispersing agent of the invention, may of course also comprise further typical additives known to the skilled person. In the context of the preferred coating compositions, such additives are, for example, photoinitiators, defoamers, wetting agents, film-forming assistants such as cellulose derivatives (for example, cellulose nitrates, cellulose acetates, cellulose acetobutyrate), reactive diluents, flow control agents, dispersants, and/or rheology control additives.

The preparation of the coating composition and pigment concentrates preferred as products is accomplished by way of the methods familiar to the skilled person and features no peculiarities. The known methods are employed, such as the gradual addition with stirring and mixing of the constituents of the coating composition in customary and known mixing assemblies such as stirred tanks or dissolvers, for example. Using the preferred pigment concentrates and coating compositions it is of course possible to produce coatings or paint films. The coating is produced by way of the techniques familiar to the skilled person of application to a substrate, and subsequent curing methods.

Application is accomplished, for example, by the known injecting, spraying, brushing, rolling, pouring, impregnating and/or dipping methods. Application of the coating composition to a substrate is followed by curing or drying by common methods. For example, the applied coating composition may be physically drying, curable thermally and/or with use of actinic radiation (radiation-curing), preferably UV radiation, and also electronic radiation. The thermal curing may take place, for example, in the range from around 10° C. to around 400° C., depending on the nature of the coating composition and/or of the substrate. The duration of curing is also dependent individually, for example, on the nature of the curing method (thermal or actinic), the nature of the coating composition used and/or the substrates. For example, curing may last for between 1 minute and several hours or even days. The substrate at this stage may be in motion or else at rest. The curing conditions can be adapted by the skilled person to the case in hand without problems on the basis of his or her art knowledge.

Below, working examples are employed to demonstrate that the wetting and dispersing agents of the invention exhibit an outstanding dispersing activity in pigmented coating systems or paints, resulting in advantageous properties such as good storage stability, high gloss and/or minimal haze. A good balance of these properties is achieved. In comparison to conventional wetting and dispersing agents, the broad-spectrum applicability for use in different coating systems is improved.

WORKING EXAMPLES

Initial Remarks

In the case of substances with molecular nonuniformity, the reported molecular weights—below as in the description above—represent average values of the numerical average. The molecular weights or number-average molecular weights $M_n$ are determined when there are ascertainable functional end groups present such as hydroxyl, NCO, amino, or acid groups by end-group ascertainment via the determination of OH number, NCO number, amine number, or acid number by titration, respectively. In the case of compounds for which an end-group ascertainment is not applicable, the number-average molecular weight is determined by means of gel permeation chromatography against a polystyrene standard. Molecular weights reported in the case of the polyamines are ebullioscopically determined numerical averages $M_n$.

Unless stated otherwise, figures in parts are parts by weight and figures in percentages are percentages by weight.

The free NCO content of the polyisocyanates employed and also the reaction profile of the NCO additions is determined in accordance with EN ISO 9369 by reaction with butylamine and subsequent titration of the amine excess. These methods are also described in Saul Patai "The Chemistry of Cyanates and their Thioderivatives", Part 1, chapter 5, 1977.

Synthesis of Modified polyhydroxymonocarboxylic Acids (b):

The modified organic polyhydroxymonocarboxylic acids (b) 1 to 7 were prepared in accordance with the following general synthesis instructions:

An unmodified polyhydroxymonocarboxylic acid, ε-caprolactone, and optionally δ-valerolactone were admixed with dibutyltin dilaurate (200 ppm) and stirred under inert gas at 170° C. until the proportion of nonvolatile fractions (2.0±0.1 g test substance, duplicate determination, 10 minutes, 150° C.; EN ISO 3251) exceeds a value of 98%. The particular compounds used and their amounts are reproduced in table 1. The products were obtained in the form of colorless to pale yellowish liquids, of which some may undergo waxlike solidification on storage.

TABLE 1

| | (Unmodified) polyhydroxycarboxylic acid used | Amount | Amount of ε-capro-lactone | Amount of δ-valero-lactone |
|---|---|---|---|---|
| (b)1 | 2,2-bis(hydroxymethyl)-propionic acid | 100 g | 170.17 g | |
| (b)2 | 2,2-bis(hydroxymethyl)-propionic acid | 100 g | 170.17 g | 74.64 g |
| (b)3 | 2,2-bis(hydroxymethyl)-propionic acid | 100 g | 255.26 g | 74.64 g |
| (b)4 | 2,2-bis(hydroxymethyl)-propionic acid | 100 g | 340.00 g | |
| (b)5 | 2,2-bis(hydroxymethyl)-propionic acid | 100 g | 425.43 g | |
| (b)6 | 2,2-bis(hydroxymethyl)-propionic acid | 100 g | 425.43 g | 149.29 |
| (b)7 | 2,2-bis(hydroxymethyl)-propionic acid | 100 g | 850.56 g | |
| (b)8 | 2,2-bis(hydroxymethyl)-butyric acid | 100 g | 385.21 g | |

Synthesis of Modified Amino-Group-Containing Organic Polymers (a):

The modified amino-group-containing organic polymers (a) 1 to 4 were prepared in accordance with the following general synthesis instructions:

An unmodified, amino-group-containing organic polymer (a), ε-caprolactone, and optionally δ-valerolactone were admixed with dibutyltin dilaurate (200 ppm) and stirred under nitrogen at 170° C. until the proportion of nonvolatile fractions (2.0±0.1 g test substance, duplicate determination, 10 minutes, 150° C.; EN ISO 3251) exceeds a value of 98%. The products were obtained in the form of yellow to pale brown liquids, of which a number may undergo waxlike solidification on storage.

The particular compounds used and their amounts are reproduced in table 2.

TABLE 2

| Modified amino-group-containing polymer A | Polyamine (unmodified A) [1] | Amount | Amount of ε-capro-lactone | Amount of δ-valero-lactone |
|---|---|---|---|---|
| (a)1 | Epomin SP 200 | 1.0 g | 9.4 g | |
| (a)2 | Epomin SP 003 | 1.0 g | 26.7 g | |
| (a)3 | Epomin SP 018 | 1.0 g | 26.7 g | |
| (a)4 | Epomin SP 018 | 1.0 g | 22.7 g | 4.1 g |

[1] Epomin: aziridine homopolymers (polyethylenimine polymers (Nippon Shokubai)

Synthesis of Organic Monoisocyanates Containing One Isocyanate Group:

The organic monoisocyanates (R-NCO) 1 to 9 were prepared in accordance with the following general synthesis instructions from diisocyanates and monoalcohols:

The diisocyanate (at least 1.0 mol, typically 2.0 to 10.0 mol; cf. table 3) is introduced under nitrogen and the dry (Karl Fischer water content <0.1%) monoalcohol (1.0 mol) is slowly added dropwise, so that the reaction temperature does not exceed 60° C. After the end of the addition, stirring at 60° C. is continued until the NCO number of the product does not change significantly over a period of 30 minutes.

If using an excess of diisocyanate, the excess of diisocyanate that remains after the end of the reaction is removed by distillation through the use of a thin-film or short-path evaporator.

The particular diisocyanates and monoalcohols used and also their molar ratios are reproduced in table 3.

TABLE 3

| Mono-isocyanate | Diisocyanate | Monoalcohol | Molar ratio diisocyanate/ monoalcohol |
|---|---|---|---|
| (R-NCO)1 | Desmodur T 100 | Polyglycol B 01/40 | 2.5:1 |
| (R-NCO)2 | Desmodur T 100 | Polyglycol B01/120 | 2:1 |
| (R-NCO)3 | Desmodur T 80 | Polyglycol B11/50 | 10:1 |
| (R-NCO) 4 | Desmodur T 100 | Polyglycol B11/70 | 10:1 |
| (R-NCO) 5 | Desmodur T 80 | MPEG 350 | 5:1 |
| (R-NCO) 6 | Desmodur T 80 | MPEG 500 | 5:1 |

TABLE 4

| Ex. | Polyamine (a) | Amount of (a) | Polyhydroxy- monocarboxylic acid (b) | Amount of (b) | AN | Organic monoisocyanate | Degree of conversion of OH groups in mol % |
|---|---|---|---|---|---|---|---|
| 1 | Epomin SP 200 | 1.0 g | 2,2-bis(hydroxy-methyl)propionic acid | 13.7 g | 8.2 | (R—NCO) 5 | 5 |
| 2 | Epomin SP 018 | 1.0 g | (b) 1 | 24.2 g | 9.7 | (R—NCO) 9 | 10 |
| 3 | Epomin SP 200 | 6.5 g | (b) 2 | 59.0 g | 7.4 | (R—NCO) 3 | 45 |
| 4 | Epomin SP 003 | 6.5 g | (b) 2 | 59.0 g | 8.9 | (R—NCO) 4 | 45 |
| 5 | Epomin SP 200 | 1.2 g | (b) 3 | 59.0 g | 6.1 | (R—NCO) 1 | 50 |
| 6 | Epomin SP 200 | 0.9 g | (b) 4 | 59.0 g | 8.8 | (R—NCO) 1 | 95 |
| 7 | Lupasol WF[1] | 1.5 g | (b) 3 | 59.0 g | 6.8 | (R—NCO) 1 | 45 |
| 8 | Lupasol WF | 2.5 g | (b) 5 | 59.0 g | 9.7 | (R—NCO) 3 | 25 |
| 9 | Epomin SP 200 | 1.0 g | (b) 6 | 50.0 g | 6.4 | (R—NCO) 1 | 50 |
| 10 | Lupasol WF | 1.0 g | (b) 7 | 100 g | 9.1 | (R—NCO) 3 + (R—NCO) 4 | 30 + 30 |
| 11 | Epomin SP 018 | 1.2 g | (b) 7 | 59.0 g | 7.6 | (R—NCO) 7 | 30 |
| 12 | Epomin SP 018 | 1.5 g | (b) 8 | 118 g | 9.8 | (R—NCO) 8 | 25 |
| 13 | (a) 1 | 1.5 g | (b) 2 | 118 g | 9.8 | (R—NCO) 5 | 10 |
| 14 | (a) 2 | 6.5 g | (b) 2 | 59.0 g | 4.1 | (R—NCO) 5 + (R—NCO) 6 | 10 + 5 |
| 15 | (a) 2 | 6.5 g | (b) 3 | 59.0 g | 7.7 | (R—NCO) 1 | 40 |
| 16 | (a) 3 | 1.0 g | (b) 5 | 52.7 g | 6.8 | (R—NCO) 2 | 75 |
| 17 | (a) 4 | 1.0 g | (b) 7 | 52.7 g | 9.6 | (R—NCO) 8 | 25 |

[1]Lupasol WF: aziridine homopolymer (polyethyleneimine polymer) (BASF)

TABLE 3-continued

| Mono-isocyanate | Diisocyanate | Monoalcohol | Molar ratio diisocyanate/ monoalcohol |
|---|---|---|---|
| (R-NCO) 7 | Desmodur T 100 | DCPE1100 | 4:1 |
| (R-NCO) 8 | Desmodur T 100 | MCVPE1500 | 4:1 |
| (R-NCO)9 | Desmodur T 100 | 12-Hydroxystearic acid | 5:1 |

Desmodur T 100: 2,4-tolylene diisocyanate (Bayer),
Desmodur T 80: 2,4- and 2,6-tolylene diisocyanate in a ratio of 80:20 (Bayer),
MPEG 350/500: methoxypolyethylene glycol, $M_n$: 350/500,
Polyglycol B01/40: PO polyether prepared starting from butanol, $M_n$ = 1100, Clariant,
Polyglycol B01/120: PO polyether prepared starting from butanol, $M_n$ = 2000, Clariant,
Polyglycol B11/50: EO/PO polyether (1:1) prepared starting from butanol, $M_n$ = 1700, Clariant,
Polyglycol E11/70: EO/PO polyether (1:1) prepared starting from butanol, $M_n$ = 2000, Clariant,
DCPE1100: monohydroxy-functional ε-caprolactone polyester prepared starting from decanol, $M_n$ 1100,
MCVPE1500: monohydroxy-functional polyester of methoxypolyethylene glycol $M_n$ 500, ε-caprolactone and δ-valerolactone (molar ratio 1:7:2), $M_n$ 1500.

Synthesis of Inventive Wetting and Dispersing Agents:

Amino-group-containing organic polymers (a), polyhydroxymonocarboxylic acids (b), and organic monoisocyanates were reacted in the subsequent step, in accordance with the following general working instructions, to give wetting and dispersing agents:

The optionally modified polyaminic material (a) was heated under nitrogen to 180° C. and the respective optionally modified polyhydroxymonocarboxylic acid (b) was added in portions. The batch was stirred at this temperature until the acid number (AN as per DIN 53402) reached a value of less than 10 mg KOH/g solids. During the reaction the water of reaction formed was removed by distillation at the selected reaction temperature and collected in a water separator.

Then the hydroxyl number (as per DIN ISO 4629) of the resultant product was ascertained and the hydroxyl groups were reacted proportionally with the respective monoisocyanate at a temperature of 60° C. under nitrogen. The wetting and dispersing agents of the invention were obtained as pale brown oils of high viscosity.

The particular compounds used and their amounts are reproduced in table 4.

In addition, example compounds (comparative wetting and dispersing agents) from WO2008/037612 were produced and subjected to performance investigation as described below. The comparative wetting and dispersing agents prepared were obtained in the form of deep-black solids. It was found that the substance identified as compound 58 from the examples given in WO2008/037612 yields the best performance results. This compound was therefore included as a reference material in the investigations in relation to the testing of the inventive wetting and dispersing agents.

The reference material was prepared in accordance with the following working instructions: 0.9 g of Epomin SP 200 was heated to 180° C. and 59.0 g of intermediate (b) 4 were added in portions. The mixture was stirred at 180° C. until the acid number of the product reached a value of 9.9. Water of reaction formed was removed by distillation. Then 16.0 g of lauric acid were added and the mixture was stirred at 180° C. for 30 hours until water could no longer be removed by distillation. This gave a deep-black waxlike solid.

Furthermore, the inventive wetting and dispersing agent was prepared in accordance with the following working instructions:

0.9 g of Epomin SP 200 was heated to 180° C. and 59.0 g of intermediate (b) 4 were added in portions. The mixture was stirred at 180° C. until the acid number of the product reached a value of 9.9. Water of reaction formed was removed by distillation. Then the batch was cooled to 70° C. and 16.88 g of lauryl isocyanate were added. The batch was stirred for 3 hours until free isocyanate could no longer be detected. This gave a pale brown, waxlike solid.

While reference compound 58 is obtained as a deep-black product after a comparatively long reaction time, compound 18 can be synthesized more easily and more quickly and also with a paler color.

Table 5 shows once again an overview of the reference material and also of inventive wetting and dispersing agent 18.

TABLE 5

| Ex. | Polyamine (a) | Amount of (a) | Poly-hydroxy-mono-carboxylic acid (b) | Amount of (b) | Organic radical (c) | Amount of (c) |
|---|---|---|---|---|---|---|
| "58" | Epomin SP 200 | 0.9 g | (b) 4 | 59.0 g | lauric acid | 16.0 g |
| 18 | Epomin SP 200 | 0.9 g | (b) 4 | 59.0 g | lauryl isocyanate | 16.88 g |

Performance Investigations

Some of the wetting and dispersing agents 1 to 17 were subjected to performance investigation. For this purpose various pigment pastes or pigmented coating compositions/paints, as described later on below, were prepared using the wetting and dispersing agents. Thereafter the coating compositions or paints were applied and cured or dried in accordance with methods familiar to the skilled person on polyethylene films, polyester films, paper cards, and/or glass plates.

Rub-Out Test:

Following its preparation, the test paint was applied to a film on an inclined plate (angle 60 to 70°) and the paint film was dried at room temperature overnight. The floating or flooding of the pigments in the coating films produced was then evaluated using a rub-out test. This test evaluated the ΔE value as a result of rub-out (rub-out: the uncured paint surface is rubbed with the finger until the color difference (ΔE) between rubbed and untreated areas has reached its maximum value and this color difference remains constant. This color difference is measured quantitatively). High values correspond to poor floating behavior.

Further performance investigations:

A visual assessment was made of coating films. This was done by curing or drying each of the applied paints. On the dried film drawdowns, in other words the finished paint films, the transparency was investigated (rating system 1 to 6, where 1=very good, 6=unsatisfactory). Also investigated were the gloss (20° geometry, high values corresponding to a high gloss), the haze (low values correspond to low haze), and the formation of gel specks.

First of all, binder-free pigment concentrates were prepared using some of the wetting and dispersing agents 1 to 16 and the substance from WO2008/037612, identified as compound 58, and also using the pigments Heliogen Blue L7101, Carbon Black FW 200, and Bayferrox 120M, and organic solvents.

(Dispersing conditions: Dispermat CV at 40° C. with 1 mm glass beads, glass beads: pigment concentrate weight ratio=1:1, Teflon disk diameter=40 mm; Bayferrox 120M: 40 minutes at 17 m/s (8000 rpm), Heliogen Blue L7101 F: 40 minutes at 21 m/s (10 000 rpm), Carbon Black FW 200: 90 minutes at 21 m/s (10 000 rpm)).

The compositions of the binder-free pigment concentrates were as follows:

Binder-free pigment concentrates pigmented with Heliogen Blue L7101 F:

| | % by weight |
|---|---|
| Methoxypropyl acetate | 66.2 |
| Diacetone alcohol | 7.3 |
| Wetting and dispersing agent (100% solids) | 7.5 |
| Heliogen Blue L7101 F[1] | 20.0 |

[1]BASF

Binder-free pigment concentrates pigmented with Carbon Black FW 200:

| | % by weight |
|---|---|
| Methoxypropyl acetate | 69.7 |
| Diacetone alcohol | 7.8 |
| Wetting and dispersing agent (100% solids) | 10.5 |
| Carbon Black FW 200 [1] | 12.0 |

[1] Evonik

Binder-free pigment concentrates pigmented with Bayferrox 120M:

| | % by weight |
|---|---|
| Methoxypropyl acetate | 23.9 |
| Diacetone alcohol | 2.7 |
| Wetting and dispersing agent (100% solids) | 8.1 |
| Fumed silica (Aerosil R972) | 0.3 |
| Bayferrox 120M[1] | 65.0 |

[1]Lanxess

The binder-free pigment concentrates were formulated with different letdown systems to give pigmented paints. Letdown systems and paints were each obtained by mixing the ingredients specified below.

Formulation of an acrylate letdown system (letdown system 1):

| | % by weight |
|---|---|
| Paraloid B66 (50% in xylene)[1] | 70.0 |
| DIDP | 2.0 |
| Xylene | 21.8 |
| Methoxypropyl acetate | 6.0 |
| BYK-306 | 0.2 |

[1]Acrylate binder (from Rohm and Haas)

Formulation of an acrylate/cellulose acetobutyrate (CAB) letdown system (letdown system 2):

| | % by weight |
|---|---|
| Paraloid B66 (50% in solvent mixture*) | 77.8 |
| CAB 381.2 (20% in solvent mixture*)[1] | 11.1 |
| Solvent mixture d* | 9.0 |
| BYK-306 | 0.1 |
| DIDP | 0.2 |

[1]Cellulose acetobutyrate (Eastman Chemicals)
*Solvent mixture: 30% xylene, 30% butyl acetate, 20% isopropanol, 20% butylglycol Formulation of the pigmented acrylate/acrylate-CAB paints Acrylate Paints:

|  | Bayferrox 120M | Helogen Blue L7101 F | FW 200 |
|---|---|---|---|
| Letdown system 1 | 27.2 | 25.5 | 27.5 |
| Pigment concentrate | 2.8 | 4.5 | 2.5 |
| Incorporation of pigment concentrates for 5 minutes using Scandex shaker | | | |
| Xylene | 3.0 | 3.0 | 3.0 |
| Pigment content in the paint | 6% | 3% | 1% |

Acrylate-CAB Paints:

|  | Bayferrox 120M | Helogen Blue L7101 F | FW 200 |
|---|---|---|---|
| Letdown system 2 | 27.2 | 25.5 | 27.5 |
| Pigment concentrate | 2.8 | 4.5 | 2.5 |
| Incorporation of pigment concentrates for 5 minutes using Scandex shaker | | | |
| Xylene | 7.5 | 7.5 | 7.5 |
| Pigment content in the paint | 6% | 3% | 1% |

Performance Investigations and Properties:

The tables below each set out the wetting and dispersing agent employed in the respective pigment concentrate and the pigment employed (cf. also compositions of the pigment concentrates above), and also the paint system employed. Likewise indicated are the corresponding performance properties measured.

Results for Carbon Black FW200/acrylate paint

| Wetting and dispersing agent | Gloss 20° [GU] | Haze | Transparency* (visual) | Specking |
|---|---|---|---|---|
| 4 | 68 | 39 | 2 | no specks |
| 5 | 69 | 47 | 2 | no specks |
| 6 | 68 | 48 | 2 | no specks |
| 7 | 78 | 52 | 2 | no specks |
| 15 | 72 | 58 | 2-3 | no specks |
| 16 | 64 | 34 | 3 | no specks |
| 18 | 62 | 58 | 4 | some specks |
| 58 (comparative) | 63 | 61 | 4 | some specks |

*Evaluation by ratings: 1 = very good, 6 = deficient

Results for Heliogen Blue L7101 F/acrylate paint

| Wetting and dispersing agent | Gloss 20° [GU] | Haze | Transparency* (visual) | Specking |
|---|---|---|---|---|
| 4 | 75 | 21 | 1 | no specks |
| 5 | 79 | 24 | 1-2 | no specks |
| 6 | 80 | 22 | 1 | no specks |
| 7 | 76 | 31 | 1 | no specks |
| 15 | 80 | 27 | 2 | no specks |
| 16 | 81 | 19 | 2 | no specks |
| 18 | 74 | 31 | 3 | no specks |
| 58 (comparative) | 73 | 33 | 3 | no specks |

*Evaluation by ratings: 1 = very good, 6 = deficient

Results for Bayferrox 120M/acrylate paint

| Wetting and dispersing agent | Gloss 20° [GU] | Haze | ΔE values | Specking |
|---|---|---|---|---|
| 4 | 52 | 81 | 5.2 | no specks |
| 5 | 53 | 78 | 4.7 | no specks |
| 6 | 56 | 74 | 4.4 | no specks |
| 7 | 56 | 64 | 4.3 | no specks |
| 15 | 47 | 75 | 4.8 | no specks |
| 16 | 52 | 72 | 4.3 | no specks |
| 18 | 49 | 86 | 8.9 | no specks |
| 58 (comparative) | 48 | 89 | 9.1 | no specks |

Results for Carbon Black FW200/acrylate-CAB paint

|  | Gloss 20° [GU] | Haze | Transparency* (visual) | Specking |
|---|---|---|---|---|
| 4 | 69 | 36 | 3 | no specks |
| 5 | 64 | 48 | 3 | few specks |
| 6 | 68 | 47 | 2-3 | few specks |
| 7 | 75 | 25 | 2 | some specks |
| 15 | 78 | 53 | 1-2 | no specks |
| 16 | 63 | 49 | 1-2 | no specks |
| 18 | 59 | 78 | 3 | few specks |
| 58 (comparative) | 58 | 76 | 3 | few specks |

*Evaluation by ratings: 1 = very good, 6 = deficient

Results for Heliogen Blue L7101 F/acrylate-CAB paint

|  | Gloss 20° [GU] | Haze | Transparency* (visual) | Specking |
|---|---|---|---|---|
| 4 | 79 | 20 | 1-2 | no specks |
| 5 | 75 | 24 | 1-2 | no specks |
| 6 | 78 | 23 | 1 | no specks |
| 7 | 81 | 17 | 2 | no specks |
| 15 | 76 | 28 | 1 | no specks |
| 16 | 82 | 33 | 1-2 | no specks |
| 18 | 78 | 36 | 2 | no specks |
| 58 (comparative) | 74 | 32 | 2 | no specks |

*Evaluation by ratings: 1 = very good, 6 = deficient

Results for Bayferrox 120M/acrylate-CAB paint

|  | Gloss 20° [GU] | Haze | ΔE values | Specking |
|---|---|---|---|---|
| 4 | 63 | 68 | 3.8 | no specks |
| 5 | 59 | 50 | 3.5 | no specks |
| 6 | 62 | 49 | 3.3 | no specks |
| 7 | 75 | 63 | 4.0 | no specks |
| 15 | 68 | 54 | 3.3 | no specks |
| 16 | 53 | 59 | 3.1 | no specks |
| 18 | 54 | 69 | 4.1 | no specks |
| 58 (comparative) | 52 | 70 | 4.2 | no specks |

In addition, pigmented paints were investigated for their storage stability. For this purpose, the epoxy component (component A) of a 2-component (2K) epoxy paint system was admixed with the binder-free pigment concentrate comprising carbon black FW 200 (proportion: 1.5 wt %) and stored at 50° C. over a period of 12 weeks. The tables below give an overview of the 2-component paint system used and also of the storage stability of the pigmented epoxy component under investigation (component A).

Formulation of the 2K Paint
Component A:

|  | [%] |
|---|---|
| Epikote 1001 (75% in xylene)[1] | 60.0 |
| Xylene | 17.0 |
| Methoxypropanol | 12.8 |
| n-Butanol | 10.0 |
| BYK-325 | 0.2 |
|  | 100 |

[1]Epoxy binder (Hexion)

Component B:

|  | [%] |
|---|---|
| Aradur 115 X 70[1] | 35.5 |
| Xylene | 6.0 |
| Methoxypropanol | 4.0 |
| n-Butanol | 4.5 |
|  | 50.0 |

[1]Polyamidoamine (Huntsman)

Investigation of Storage Stability:

|  |  | Storage stability after X weeks | | | | | | | |
|---|---|---|---|---|---|---|---|---|---|
|  | wt % | 1 | 2 | 3 | 5 | 7 | 9 | 11 | 12 |
| No wetting and dispersing agent | — | OK | OK | OK | OK | OK | OK | OK | OK |
| 4 | 1.5 | OK | OK | OK | OK | OK | OK | OK | OK |
| 5 | 1.5 | OK | OK | OK | OK | OK | OK | OK | OK |
| 6 | 1.5 | OK | OK | OK | OK | OK | OK | OK | OK |
| 14 | 1.5 | OK | OK | OK | OK | OK | OK | OK | OK |
| 15 | 1.5 | OK | OK | OK | OK | OK | OK | OK | OK |
| 18 | 1.5 | OK | OK | OK | OK | OK | OK | OK | OK |
| 58 (comparative) | 1.5 | OK | OK | OK | OK | OK | OK | OK | OK |

Throughout the storage time no gelling of the formulations was observed.

Furthermore, the performance properties of gloss, haze, transparency, floating behavior, and gel specking of pigmented 2K paints were investigated.

The 2K paints in question were as follows, based on the abovementioned components A and B and on the pigment concentrates:

|  | Bayferrox 120M | Helogen Blue L7101 F | FW 200 |
|---|---|---|---|
| Component A | 18.1 | 17.0 | 18.3 |
| Pigment concentrate | 2.8 | 4.5 | 2.5 |
| Incorporation of pigment concentrates for 10 min using Scandex shaker | | | |
| Component B: | 9.1 | 8.5 | 9.2 |
| Incorporation of pigment concentrates for 1 min using Scandex shaker | | | |
| Xylene | 3.0 | 3.0 | 3.0 |
| Pigment content in 2K paint | 6% | 3% | 1% |

Results for Carbon Black FW200/2K paint

|  | Gloss 20° [GU] | Haze | Transparency* | Specking |
|---|---|---|---|---|
| 4 | 81 | 15 | 1-2 | no specks |
| 5 | 91 | 19 | 1-2 | no specks |
| 6 | 90 | 17 | 1 | no specks |
| 7 | 79 | 25 | 1 | some specks |
| 15 | 84 | 18 | 2-3 | no specks |
| 16 | 86 | 21 | 2-3 | no specks |
| 18 | 78 | 25 | 3 | no specks |
| 58 (comparative) | 77 | 28 | 3 | no specks |

*Evaluation by ratings: 1 = very good, 6 = deficient

Results for Heliogen Blue L7101 F/2K paint

|  | Gloss 20° [GU] | Haze | Transparency* | Specking |
|---|---|---|---|---|
| 4 | 83 | 13 | 1-2 | no specks |
| 5 | 90 | 20 | 2 | no specks |
| 6 | 88 | 17 | 1-2 | no specks |
| 7 | 89 | 18 | 2 | no specks |
| 15 | 81 | 14 | 1-2 | no specks |
| 16 | 88 | 27 | 1 | no specks |
| 18 | 78 | 26 | 2 | no specks |
| 58 (comparative) | 80 | 23 | 2 | no specks |

*Evaluation by ratings: 1 = very good, 6 = deficient

Results for Bayferrox 120M/2K paint

|  | Gloss 20° [GU] | Haze | ΔE values | Specking |
|---|---|---|---|---|
| 4 | 88 | 19 | 1.7 | no specks |
| 5 | 83 | 21 | 1.9 | no specks |
| 6 | 86 | 18 | 1.6 | no specks |
| 7 | 87 | 28 | 1.4 | no specks |
| 15 | 83 | 18 | 1.7 | no specks |
| 16 | 86 | 16 | 1.8 | no specks |
| 18 | 79 | 26 | 2.2 | no specks |
| 58 (comparative) | 82 | 30 | 1.9 | no specks |

The wetting and dispersing agents of the invention exhibit good wetting and dispersing properties in various pigmented coating compositions and paints with both organic and inorganic pigments (Bayferrox 120M, Heliogen Blue L 7101

F, and Carbon Black FW 200). These good wetting and dispersing properties are clearly expressed in the investigated performance properties such as gloss, haze, transparency, and gel specking. In certain paint systems these properties are comparable with or even slightly better than properties resulting when using a conventional wetting and dispersing agent. In certain other paint systems a significantly improved properties profile is achieved. The wetting and dispersing agents of the invention, moreover, exhibit comparatively pale coloring. More particularly it is possible to avoid a deep-black coloration. The broad-spectrum applicability of the wetting and dispersing agents of the invention is outstanding and represents an improvement over the prior art.

The invention claimed is:

1. A wetting and dispersing agent prepared by a process comprising
   in step (1) reacting
      (a) an amino-group-containing organic polymer containing primary and/or secondary amino groups selected from polyethyleneimines, polyvinylamines, polyallylamines and copolymers of these polymers and
      (b) at least one of 2,2-bis(hydroxymethyl)propionic acid and 2,2-bis(hydroxymethyl)butyric acid,
   by condensation reactions with formation of amide bonds, and
   in step (2) reacting
      at least some of the hydroxyl groups of the hydroxy-functional reaction product obtained in step (1) with at least one organic monoisocyanate to form urethane bonds.

2. The wetting and dispersing agent as claimed in claim 1, wherein in step (1) the components are reacted such that the molar ratio of the primary and secondary amino groups of component (a) to component (b) is in the range from 0.01 to 1.

3. The wetting and dispersing agent as claimed in claim 2, wherein in step (1) the components are reacted such that the molar ratio of the primary and secondary amino groups of component (a) to component (b) is in the range from 0.1 to 1.

4. The wetting and dispersing agent as claimed in claim 1, wherein in step (2) more than 5 mol % of the hydroxyl groups of the reaction product obtained in step (1) are reacted with the at least one organic monoisocyanate.

5. The wetting and dispersing agent as claimed in claim 4, wherein in step (2) 40 to 80 mol % of the hydroxyl groups of the reaction product obtained in step (1) are reacted with the at least one organic monoisocyanate.

6. The wetting and dispersing agent as claimed in claim 1, wherein the at least one of 2,2-bis(hydroxymethyl)propionic acid and 2,2-bis(hydroxymethyl)butyric acid (b), before the reaction according to step (1), is reacted with monomers selected from the group consisting of lactones, alkyl-substituted lactones, and monohydroxymonocarboxylic acids with formation of ester bonds.

7. The wetting and dispersing agent as claimed in claim 6, wherein the molar ratio of the monomers selected from the group consisting of lactones, alkyl-substituted lactones and monohydroxymonocarboxylic acids to the at least one of 2,2-bis(hydroxymethyl)propionic acid and 2,2-bis(hydroxymethyl)butyric acid (b) is in the range from 0.01/1 to 1000/1.

8. The wetting and dispersing agent as claimed in claim 7, wherein the molar ratio of the monomers selected from the group consisting of lactones, alkyl-substituted lactones and monohydroxymonocarboxylic acids to the at least one of 2,2-bis(hydroxymethyl)propionic acid and 2,2-bis(hydroxymethyl)butyric acid (b) is in the range from 1/1 to 10/1.

9. The wetting and dispersing agent as claimed in claim 6, wherein the monomers are selected from the group consisting of lactones and alkyl-substituted lactones.

10. The wetting and dispersing agent as claimed in claim 9, wherein the lactones and alkyl-substituted lactones are selected from the group consisting of ε-caprolactone, δ-valerolactone, and γ-butyrolactone.

11. The wetting and dispersing agent as claimed in claim 1, wherein the amino-group-containing organic polymer (a) is selected from the group consisting of polvethyleneimines.

12. The wetting and dispersing agent as claimed in claim 1, wherein at least some of the primary and/or secondary amino groups of the amino-group-containing organic polymer (a), before the reaction of step (1), is reacted with monomers selected from the group consisting of lactones, alkyl-substituted lactones, monohydroxymonocarboxylic acids, and monocarboxylic acids, to form amide bonds and optionally ester bonds.

13. The wetting and dispersing agent as claimed in claim 12, wherein the molar ratio of the monomers selected from the group consisting of lactones, alkyl-substituted lactones, monohydroxymonocarboxylic acids, and monocarboxylic acids to the primary and/or secondary amino groups of the amino-group-containing organic polymer (a) is in the range from 1/1 to 100/1.

14. The wetting and dispersing agent as claimed in claim 13, wherein the molar ratio of the monomers selected from the group consisting of lactones, alkyl-substituted lactones, monohydroxymonocarboxylic acids, and monocarboxylic acids to the primary and/or secondary amino groups of the amino-group-containing organic polymer (a) is in the range from 5/1 to 20/1.

15. The wetting and dispersing agent as claimed in claim 12, wherein the monomers are selected from the group consisting of lactones and alkyl-substituted lactones.

16. The wetting and dispersing agent as claimed in claim 15, wherein the lactones and alkyl-substituted lactones are selected from the group consisting of ε-caprolactone, δ-valerolactone, and γ-butyrolactone.

17. The wetting and dispersing agent as claimed in claim 1, wherein the organic monoisocyanates are selected from the group consisting of monoisocyanates containing a linear or branched or cyclic alkyl radical having optionally further linear and/or branched groups, which optionally contains one or more double and/or triple bonds and has 1 to 50 carbon atoms, aryl isocyanates, isocyanate-functional polyethers, isocyanate-functional polyesters, isocyanate-functional polytetrahydrofurans, isocyanate-functional polyetheresters, and fatty acid monoisocyanates, and also from mixtures of such compounds.

18. The wetting and dispersing agent as claimed in claim 17, wherein at least one organic monoisocyanate is a reaction product of a diisocyanate with a monoalcohol.

19. The wetting and dispersing agent as claimed in claim 17, wherein at least one organic monoisocyanate is an isocyanate-functional polyether, an isocyanate-functional polytetrahydrofuran, an isocyanate-functional polyester and/or an isocyanate-functional polyetherester.

20. A method for producing a wetting and dispersing agent as claimed in claim 1, wherein
   in step (1)
      (a) the amino-group-containing organic polymer containing primary and/or secondary amino groups and (b) at least one of 2,2-bis(hydroxymethyl)propionic acid and 2,2-bis(hydroxymethyl)butyric acid, are reacted by condensation reactions with formation of amide bonds, and in step (2)

at least some of the hydroxyl groups of the hydroxy-functional reaction product obtained in step (1) are reacted with at least one organic monoisocyanate to form urethane bonds.

21. A pigment- and/or filler-containing product selected from the group consisting of pigment pastes, coating compositions, sealants, printing inks, liquid inks and plastics, comprising a wetting and dispersing agent as claimed in claim 1.

22. The pigment- and/or filler-containing product as claimed in claim 21, wherein the product is a pigment paste or a coating composition.

23. A pigment- and/or filler-containing product selected from the group consisting of pigment pastes, coating compositions, sealants, printing inks, liquid inks, and plastics, wherein the pigment- and/or filler-containing products comprise the wetting and dispersing agent as claimed in claim 1.

24. The pigment- and/or filler-containing product of claim 23, wherein the pigment- and/or filler-containing product is a pigment paste or a coating composition.

25. A wetting and dispersing agent prepared by a process comprising in step (1) reacting
(a) an amino-group-containing organic polymer containing primary and/or secondary amino groups selected from polyethyleneimines, polyvinylamines, polyallylamines and copolymers of these polymers and
(b) at least one of 2,2-bis(hydroxymethyl)propionic acid and 2,2-bis(hydroxymethyl)butyric acid by condensation reactions with formation of amide bonds, and in step (2) reacting
at least some of the hydroxyl groups of the hydroxy-functional reaction product obtained in step (1) with at least one organic monoisocyanate selected from the group consisting of monoisocyanates containing a linear or branched or cyclic alkyl radical having optionally further linear and/or branched groups, which optionally contains one or more double and/or triple bonds and has 1 to 50 carbon atoms, aryl isocyanates, isocyanate-functional polyethers, isocyanate-functional polyesters, isocyanate-functional polytetrahydrofurans, isocyanate-functional polyetheresters, and fatty acid monoisocyanates, and also from mixtures of such compounds, to form urethane bonds.

* * * * *